United States Patent Office 3,287,292
Patented Nov. 22, 1966

3,287,292
PROCESS FOR PREPARING COPOLYMERS AND TO THE RESULTING PRODUCT OF POLYESTERS CONTAINING POLYMERIZABLE GROUPS AND $\alpha,\beta$-ETHYLENICALLY UNSATURATED COMPOUNDS
Horst Dalibor, Harksheide, near Hamburg, Germany, assignor to Reichhold Chemicals, Inc., White Plains, N.Y.
No Drawing. Filed Nov. 4, 1964, Ser. No. 408,760
Claims priority, application Germany, June 27, 1960, R 28,218; Nov. 7, 1963, R 36,506
2 Claims. (Cl. 260—22)

The present invention relates to a process for preparing copolymers, and to the resulting product.

The present application is a continuation-in-part of my U.S. application Serial Number 407,874, filed October 30, 1964, corresponding to my German application R 36,057, and of my earlier U.S. application Serial Number 79,180, filed December 29, 1960, now abandoned, corresponding to my German application R 28,218, filed June 27, 1960.

In German patent application R 36,057 there is claimed a process for the preparation of copolymers of polyesters containing polymerizable groups and $\alpha,\beta$-ethylenically unsaturated compounds which is characterized in that
  (a) polyesters made up of aliphatic carboxylic acids, polyalcohols and dicarboxylic acids are copolymerized with
  (b) mixtures consisting of olefinically unsaturated compounds that contain no reactive hydrogen atoms, and olefinically unsaturated compounds that contain reactive hydrogen atoms.

As a further development of this process it has now been found that particularly advantageous copolymers can be obtained, by operating in accordance with the German patent application R 36,057 and, more particularly, by a process in which
  (a) 10–90 parts by weight of polyesters that were obtained by esterification or reesterification of saturated and/or unsaturated natural oils and/or fats and/or their fatty acids and/or synthetic fatty acids having 5 to 22 carbon atoms with polyalcohols having 2 to 6 carbon atoms, saturated and/or unsaturated dicarboxylic acids, these having been selected and reacted in such a manner that polyesters having acid numbers from about 3 to 40 and of average molecular weights from about 600 to 2500 were obtained, wherein the oils and/or fats and/or fatty acids mixed with polyalcohols were present in amounts from 30 to 70% by weight and the dicarboxylic acids used in conjunction therewith were present in amounts from 30 to 70% by weight, and
  (b) 10 to 90% by weight of mixtures consisting of $b'$ and $b''$, $b'$ being $\alpha,\beta$-ethylenically unsaturated compounds, that contain no reactive hydrogen atoms, singly or in the form of mixtures, and $b''$ being $\alpha,\beta$-ethylenically unsaturated compounds that contain at least one reactive hydrogen atom, singly or in the form of mixtures, whereby
    $b'$, either singly or in the form of mixtures, consists of 50 to 90% by weight of $\alpha,\beta$-ethylenically unsaturated compounds, that contain no reactive hydrogen atoms, and
    $b''$, either singly or in the form of mixtures, consists of 5 to 50% by weight of $\alpha,\beta$-ethylenically unsaturated compounds, that contain at least one reactive hydrogen atom,
are copolymerized by heating in the presence of solvents and polymerization promoters.

The preferred manner of carrying out this process is characterized in that (a) 15 to 85% by weight of polyesters that are obtained by esterification and/or reesterification of oils and/or fats and/or fatty acids with polyalcohols and dicarboxylic acids in the form of a mixture, wherein the mixture consists of 30 to 70% by weight of carboxylic acids, namely mono- and dicarboxylic acids, and
  (b) 15 to 85% by weight of mixtures consisting of $b'$ and $b''$,
    $b'$, singly or in the form of mixtures, consisting of 50 to 99% by weight of $\alpha,\beta$-unsaturated compounds, that contain no reactive hydrogen atoms, and
    $b''$ consisting of mixtures of from 1 to 50% by weight of $\alpha,\beta$-ethylenically unsaturated compounds, that contain at least one reactive hydrogen atom, and $b''$ again consisting of 0.5 to 5% by weight of $\alpha,\beta$-unsaturated ethylenically unsaturated carboxylic acids and/or 1 to 30% by weight of alcoholic hydroxyl groups-containing $\alpha,\beta$-unsaturated compounds and/or 1 to 15% by weight of $\alpha,\beta$-ethylenically unsaturated acid amides,
are formed into mixtures consisting of $a$, $b$, $b'$ and $b''$ which are copolymerized by heating in the presence of solvents and polymerization promoters.

The following are further illustrations of $b''$:

(I) 1 to 50% by weight alcoholic hydroxyl groups-containing $\alpha,\beta$-ethylenically unsaturated compounds or
(II) 1 to 35% by weight alcoholic hydroxyl groups-containing $\alpha,\beta$-ethylenically unsaturated compounds and
  1 to 15% by weight $\alpha,\beta$-ethylenically unsaturated acid amides or $\alpha,\beta$-ethylenically unsaturated acid imides or
(III) 0.5 to 5.0% by weight $\alpha,\beta$-ethylenically unsaturated carboxylic acids and
  1 to 15% by weight $\alpha,\beta$-ethylenically unsaturated acid amides and/or $\alpha,\beta$-ethylenically unsaturated acid amides and
  1 to 30% by weight alcoholic hydroxyl groups-containing $\alpha,\beta$-ethylenically unsaturated compounds or
(IV) 0.5 to 10% by weight $\alpha,\beta$-ethylenically unsaturated carboxylic acids and
  1 to 40% by weight alcoholic hydroxyl groups-containing $\alpha,\beta$-ethylenically unsaturated compounds
which can be copolymerized by heating in the presence of solvents and polymerization promoters.

It is also possible to use, as a further development of the invention described in application Serial No. 79,180, the following monocarboxylic acids: saturated, unsaturated, straight or branched chain, aliphatic, cycloaliphatic, aromatic and heterocyclic carboxylic acids and/or hydroxycarboxylic acids and/or aminocarboxylic acids, their anhydrides and esters, singly or in the form of mixtures. Examples of saturated monocarboxylic acids are: valeric acid, trimethylacetic acid, capronic acid, n-heptylic acid, caprylic acid, pelargonic acid, decanoic acid, lauric acid, myristic acid, palmitic acid, stearic acid, their anhydrides, their esters with short-chain alcohols, such as methanol or ethanol; examples of unsaturated carboxylic acids are: monomeric oleic acid, polymeric castor oil fatty acids, their anhydrides, their esters with short-chain alcohols, such as methanol and ethanol; examples of hydroxycarboxylic acids are: monomeric ricinoleic acid, polymeric ricinoleic acid, hydroxystearic acid, hydroxycinnamic acid, hydroxybenzoic acid, their anhydrides, their esters with short-chain alcohols, such as methanol or ethanol; examples of aromatic carboxylic acids are benzoic acid, phenylacetic acid, p-tert.-butylbenzoic acid, their esters with short-chain alcohols, such as methanol or ethanol; examples of heterocyclic carboxylic acids are: indolylacetic acid, pyridinecarboxylic acid and the like; examples of aminocarboxylic acids are: aminobenzoic acid, its anhydrides, its esters with short-chain alcohols, such as methanol or ethanol.

The monocarboxylic acids can be partially or completely replaced by their esters. Suitable esters are: those of glycerin, those of methyl, ethyl and propyl alcohols and those of lower aliphatic alcohols with the above-mentioned monocarboxylic acids.

In addition to the exemplary copolymerization components without reactive hydrogen atoms mentioned in application Serial No. 79,180, it is possible to also use as $\alpha,\beta$-ethylenically unsaturated compounds defined under $b'$, vinyl acetate, acrylonitrile, methacrylonitrile, n-butanol-methylolacrylamide, acrylic acid chloride, methacrylic acid chloride, vinyl chloride, butadiene, chlorostyrene and the like halogenstyrenes. They can be used with the polyesters either alone or in the form of mixtures.

Other suitable compounds having reactive hydrogen atoms, in addition to those already mentioned in application Serial No. 79,180, are $\alpha,\beta$-ethylenically unsaturated compounds, according to $b''$, which have the reactive hydrogen atoms at the nitrogen, being present in the form of acid amides and/or acid imides, are methacrylamide, butylmaleinatemonoamide, maleic acid imide and/or the corresponding fumaratemono- or diamides, itaconic acid diamide, butyitaconatemonoamide, butylitaconatemonoamide and/or the corresponding aconitatemono- or diamides, singly or in the form of mixtures thereof.

In addition to the unsaturated compounds having reactive hydrogen atoms mentioned in application Serial No. 79,180 which, aside from hydroxyl groups, also contain unsaturated ether groups, it is possible to use $\alpha,\beta$-ethylenically unsaturated compounds, in accordance with $b''$, that have the character of an alcohol, i.e. have one or more hydroxyl groups in the molecule; suitable for this purpose are: 2-hydroxyethylacrylate, 2-hydroxypropylacrylate, 3-hydroxybutylacrylate, 6-hydroxyhexylacrylate and/or the corresponding methacrylates and/or ethacrylates and/or phenylacrylates, 2-hydroxypropyl-butylmaleinate and di-(2-hydroxypropyl)-maleinate and/or fumarate, 2-hydroxy-3-chloropropylacrylate, 2-hydroxy-1-phenylethacrylate, 2,3-dihydroxypropylacrylate and/or the corresponding methacrylates and/or ethacrylates and/or phenylacrylates or mixtures thereof.

In addition to the compounds having reactive hydrogen atoms mentioned in application Serial No. 79,180, are also suitable $\alpha,\beta$-ethylenically unsaturated compounds that have an acid character, i.e. compounds that have one or more carboxyl groups in the molecule, as defined under $b''$, such as acrylic acid, methacrylic acid, itaconic acid, aconitic acid, maleic acid, maleic acid anhydride, fumaric acid or mixtures thereof.

Other suitable compounds, in addition to those mentioned in application Serial No. 79,180 are: polyalcohols having 2 to 6 hydroxyl groups, such as 1,2-propyleneglycol, 1,3-butyleneglycol, 1,4-butyleneglycol, trimethylolethane, trimethylolpropane, sorbitol, neopentylglycol, o, m, p-cyclohexanedimethanol and 3,3,5,5-tetrakis (hydroxymethyl) 4-hydroxytetrahydropyrane, singly or in the form of their mixtures.

In addition to the dicarboxylic acids and/or their esters already mentioned in application Serial No. 79,180, the following can be used: succinic acid, glutaric acid, tetrahydrophthalic acid, hexahydrophthalic acid and/or their anhydrides, their half-esters or diesters with short-chain alcohols, adipic acid, pimelic acid, suberic acid, azelaic acid, sebacic acid, isophthalic acid, terephthalic acid, pyromellitic acid, trimellitic acid, their half-esters, diesters or triesters with short-chain alcohols, singly or mixed with each other.

(a) The polyesters used for the copolymerization in an amount equal to 10 to 90% by weight, which have been obtained by esterification or reesterification of saturated and/or unsaturated natural oils and/or fats and/or fatty acids and/or synthetic fatty acids having 5 to 22 carbon atoms, with polyalcohols having 2 to 6 carbon atoms, and saturated and/or partially substituted unsaturated dicarboxylic acids, were selected and reacted in such a way that polyesters having acid numbers of 3 to 40 and average molecular weights of about 600 to 2500 are obtained, wherein the oils and/or fats and/or fatty acids mixed with polyalcohols were present in amounts from 30 to 70% by weight and the dicarboxylic acids in amounts from 30 to 70% by weight. They are prepared as follows:

The polyesters which are made up of aliphatic monocarboxylic acids and/or esters, polyalcohols and dicarboxylic acids, can be reacted, upon hot or cold mixing, by esterification. Suitable temperature ranges lie between about 140 and 270° C. It is possible to operate in such a way that the monocarboxylic acids are partially esterified with polyalcohols by heating them so long and in quantitative proportions such that at least one esterifiable alcoholic hydroxyl group can be made to react with the dicarboxylic acids. Instead of the monocarboxylic acids, it is also possible to use the esters. It is preferred to use as starting materials natural vegetable oils and fats which occur as triglycerides in linseed oil, soy bean oil, sunflower oil, coconut fat and/or castor oil, or occur in the mixtures thereof. In practice, it is often recommended to reesterify the natural vegetable oils or fats with additional quantities of polyalcohols to form partial polyalcohol-carboxylic acid esters, for example by heating the fatty acid glycerides at 180 to 270° C. in the presence of reesterification catalysts, with the corresponding quantities of polyalcohols, for example glycerin, trimethylolethane, trimethylolpropane, pentaerythritol, sorbitol or other polyols, mono-, di-, or higher partial esters or mixtures of partial polyalcohol-carboxylic acid esters.

The partial polyalcohol-carboxylic acid esters must have the following properties in order to be suitable for further reaction:

They must be soluble, liquescent or meltable, in the cold or upon heating, in lower aliphatic alcohols or other solvents, and must contain at least one reactive alcoholic hydroxyl group.

These reaction products are thereupon esterified by heating with dicarboxylic acids or their anhydrides and/or esters.

In the preparation of polyesters that are made up of aliphatic monocarboxylic acids and/or monocarboxylic acid esters, polyalcohols and dicarboxylic acids and/or dicarboxylic acid esters, it is important to keep in mind that 5 to 50% of equivalents of monocarboxylic acids and/or monocarboxylic acid esters and 50 to 95% of equivalents of dicarboxylic acids and/or dicarboxylic acid esters, based upon the total carboxylic acid equivalent and/or carboxylic acid ester equivalent should be used. When using close to 100% of equivalents of dicarboxylic acids and/or dicarboxylic acid esters it is recommended to carry out the esterification especially with polyalcohols having 2 hydroxyl groups. When using 50 to 95% of equivalents of dicarboxylic acids and/or dicarboxylic acid esters and 5 to 50% of equivalents of monocarboxylic acids and/or their esters, the proportion of polyalcohols having 2 hydroxyl groups can be supplemented with polyalcohols having 3 to 6 hydroxyl groups, preferably having 3 to 4 hydroxyl groups or, in the case of a diminished proportion of dicarboxylic acid or its esters, they can be completely replaced up to 50% of equivalents thereof with polyalcohols having 3 to 4 hydroxyl groups. When using tricarboxylic acid or its esters up to 20% of equivalents, it is necessary to have present up to about 20% of equivalents of monocarboxylic acids with preferably a large proportion of polyalcohol having only 2 hydroxyl groups. The proportion of polyalcohols in the polyester must always be in excess relative to the carboxylic acids, i.e. for 1 equivalent of carboxylic groups there should be used 1.1–1.4 equivalent of hydroxyl groups.

When using natural oils and fats, for reesterification with polyalcohols, it is recommended to use particularly polyalcohols having 3 to 6 hydroxyl groups, preferably gylcerin, trimethylolpropane, trimethylolethane, pentaerythrite or mixtures thereof.

The polyesters to be used for copolymerization with the α,β-ethylenically unsaturated compounds must have the following properties:

They must be soluble in aromatic solvents, or partially soluble in lower aliphatic alcohols, as for example butanol, or in ketones, such as butanone or methylisobutylketone. Moreover, the polyesters must contain α,β-ethylenically unsaturated compounds, for example carboxylic acid radicals of castor oil fatty acids, of isomerized linseed, soy bean, cotton, and sunflower oil fatty acids and/or of maleic acid, fumaric acid, itaconic acid, aconitic acid. The polyester used for the copolymerization must, therefore, contain conjugated and/or isolated double bonds. Preferred are the aforesaid monocarboxylic acids, such as castor oil fatty acid, linseed oil fatty acid, soy bean oil fatty acid, cotton oil fatty acid, sunflower oil fatty acid, and/or their esters in quantitative proportions of 20 to 50% by weight and/or 0.5 to 3% by weight of maleic acid, fumaric acid, itaconic acid, acrylic acid and/or methacrylic acid.

The preparation of the copolymers from the polyesters and the α,β-ethylenically unsaturated compounds is carried out as follows:

The polyesters dissolved in solvents is heated to 70 to 150° C. and the polymerization starts upon introducing the α,β-ethylenically unsaturated compounds that may contain the polymerization accelerators dissolved therein, or upon separately introducing the latter, into the polyester solution within 1 to 3 hours. The polymerization is thereupon continued at 70 to 150° C. over a period of several hours until a substantially theoretical solids content of the solution consisting of polyesters and α,β-ethylenically unsaturated compounds has been obtained. If the solids content is not arrived at after the aforesaid introductions, it is necessary to introduce further quantities up to 5% of the polymerization accelerator based upon the solids content of the solution. The resulting copolymers must be soluble in the solvents, thus forming a clear solution, and must be compatible, in the cold or upon heating with aminoplasts, i.e. with melamineformaldehyde and/or urea-formaldehyde resins etherified with alcohols having from 1 to 4 carbon atoms. The mixtures prepared from the copolymers and the melamineformaldehyde and/or ureaformaldehyde resins etherified with alcohols having from 1 to 4 carbon atoms, in a ratio of 60 to 95% by weight of copolymer to 5 to 40% by weight of the said aminoplast, must yield upon baking at 120° C. for 30 minutes clear transparent coatings. For lowering the viscosity it is possible to use 0.5 to 5% by weight, based upon the solids content, of polymerization chain modifiers, such as laurylmercaptan, butylmercaptan, chloroform or formaldehydesulfinic acid and the like. The polymerization modifiers may be dissolved in the polyester or in the α,β-ethylenically unsaturated compounds, or may be added separately to the solutions.

As polymerization accelerators it is possible to use: N,N′-azodiisobutyronitrile, benzoyl peroxide, cumene hydroperoxide and the like. The selection of the polymerization accelerator depends upon the reaction temperature to be used for the copolymerization, i.e. the polymerization accelerator must be selected in such a way that it breaks up into radicals at the selected reaction temperature and thus initiates the polymerization.

As the solvents, in which the polymerization between polyesters and α,β-ethylenically unsaturated compounds takes place, it is recommended to select those that are inert and participate in the reaction only to an insignificant extent; for example, it is possible to use solvents such as xylene, toluene, methylisobutylketone, dioxane, methylethylketone, butanol, ethylglycol, butylglycol or diacetone alcohol and the like, singly or mixed with one another.

The selection of the α,β-ethylenically unsaturated compounds that contain no reactive carbon atoms, for use as component for the copolymerization, is made in accordance with the following criterion:

Available for the preparation of copolymers, aside from the unsaturated polyesters, are in the first place the acrylate esters and/or methacrylate esters and/or styrene and/or substituted styrenes, that can be used singly or in the form of their mixtures. The acrylate esters and/or methacrylate esters consist of the radicals of acrylic acid and/or methacrylic acid and the alcohol radicals having 1 to 12 carbon atoms. These compounds and the styrenes are used, as one chooses, either for increasing the hardness, improving the elasticity and toughness of the film and, to a certain degree, for improving the adhesiveness of the films on various supports, such as metals, wood, plastics, fabrics of all types and mineral surfaces. Thus, it is preferred to use for improving the elasticity and adhesiveness on the aforesaid supports, the efficiently plasticizing acrylate esters and/or methacrylate esters having 4 to 12 carbon atoms, whereas for increasing the hardness it is more desirable to use styrene and/or the acrylate esters and/or the methacrylate esters consisting of radicals of acrylic acid and/or methacrylic acid and the alcohol radicals having 1 to 3 carbon atoms.

In accordance with the present invention these products should not only be compatible with aminoplasts and melamine and/or urea-formaldehyde resins etherified with alcohols having 1 to 4 carbon atoms, but should be capable of forming, upon baking, insoluble cross-linked products. Example 8 of U.S. Patent 2,939,854 describes the use of acrylic acid and methacrylic acid which promote the compatibility between copolymers and aminoplasts. After running a test, it was found that although these products together with aminoplasts, upon baking, gave films that are compatible, they are much more brittle and do not possess chemical resistance toward aromatic solvents, i.e. they are insufficiently cross-linked; such products are therefore not weatherproof. The present invention has shown the way, whereby a very satisfactory resistance toward aromatic solvents, excellent surface hardness and reliable weathering properties over a period of years, are achieved after baking the films consisting of mixtures of copolymers and aminoplasts.

The hydroxyl number should be 20 to 120, based upon the α,β-ethylenically unsaturated groups. Preferred are hydroxyl numbers between 40 to 100.

For lowering the temperatures of the reaction between the copolymer, consisting of unsaturated polyesters and α,β-ethylenically unsaturated compounds, partially without reactive hydrogen atoms and partially with reactive hydrogen atoms, and having a hydroxyl number of 20 to 120, and the aminoplasts, it is proposed to add also carboxyl groups-carryings α,β-ethylenically unsaturated compounds during the preparation of the copolymer. The acid numbers of the copolymers must not exceed the value of about 35 or 40.

Moreover, it is possible to use in the present process not only copolymers that always contain alcoholic hydroxyl groups and optionally carboxyl groups in the α,β-ethylenically unsaturated radicals, but also copolymers that optionally contain acid amide and/or acid imide groups. The latter acid amides and/or acid imides should preferably be present in an amount essentially not higher or lower than 1 to 15% by weight.

PREPARATION OF PREPRODUCTS (POLYESTERS)

Preproduct A 1065 parts by weight castor oil fatty acid
353 parts by weight pentaerythritol
270 parts by weight ethylene glycol
773 parts by weight phthalic acid anhydride and
37.5 parts by weight maleic acid anhydride are introduced into a flask equipped with a thermometer, stirrer, reflux cooler and water separator and esterified therein by heating at 180° C. until the acid number is from 50 to 60, then at 180 to 200° C. with water separation and xylene recycle until the acid number is from 25 to 30 and until the viscosity of a 60% solution in xylene is from 50 to 60 DIN sec., measured at 20° C., the esterification product being then diluted with xylene up to 70%.

Preproduct B 1120 parts by weight of a branched glycidyl fatty acid having an epoxide value of 250 (commercial name $K_{1214}$ Shell)
409 parts by weight glycerin
42 parts by weight maleic acid anhydride
1232 parts by weight phthalic acid anhydride are heated as in A up to 215° C. for 3 hours with water separation and then esterified therein by heating in a xylene recycle at 200 to 215° C. until the acid number is from 10 to 15 and until the viscosity of a 60% solution in xylene is from 50 to 60 DIN-sec., measured at 20° C., the esterification product being then diluted with xylene up to 80%.

Preproduct C 310 parts by weight of a mixture of saturated fatty acids having 5 to 9 carbon atoms and an acid number of 370 and an iodine number of 4
490 parts by weight trimethylolpropane
340 parts by weight phthalic acid anhydride
113 parts by weight adipic acid and
22 parts by weight maleic acid anhydride are esterified, as in A, within 15 to 20 hours at a temperature of 140 to 220° C., the temperature being slowly increased, until the acid number is from 8 to 12 and the viscosity of a 50% solution in xylene is from 40 to 60 DIN-sec., measured at 20° C., the resulting esterification product being then diluted with xylene up to 80%.

Preproduct D 1050 parts by weight castor oil
500 parts by weight trimethylolpropane and
0.15 part by weight calcium acetate are reesterified at 255° C. for 2 hours, until a sample can be diluted in the cold with ethanol without turbidity in a ratio of 1:20. After this, there are added at 180° C.

2 ml. triphenylphosphate
160 parts by weight trimethylolpropane
773 parts by weight phthalic acid anhydride and
38 parts by weight maleic acid anhydride and the whole is esterified at a temperature up to 200° C., with separation of water, and thereafter at 220° C. with xylene recycle until the acid number is 20 to 25. The resin is dissolved in xylene up to 70%.

COPOLYMERS

Example 1

600 parts by weight of Preproduct A dissolved up to 70% in xylene are mixed with
686 parts by weight of xylene and
134 parts by weight butanol
  and heated to 120 to 130° C. To this solution is added a mixture consisting of
48 parts by weight hydroxypropylmethacrylate
12 parts by weight methacrylic acid
120 parts by weight butylacrylate
6 parts by weight benzoyl peroxide within a period of 2 hours, while maintaining the temperature of 120 to 130° C. for a few more hours. To arrive at a 60% solids content of the solution, may require further additions of peroxide catalyst; the total peroxide addition, however, should not be in excess of 5%; in some cases 0.5 to 3% was found sufficient. Between each addition of peroxide, the polymerization is continued for several hours. The quantities are proportioned in such as way that soluble products are formed. In the present case, it suffices to use 8 to 12 parts by weight of benzoyl peroxide, which are added in 3 parts within time intervals of 2 hours. The 60% solution has a viscosity of 130 to 180 DIN-sec., measured at 20° C. The resulting solution, upon application and drying thereof, yields at normal or raised temperatures hard and tough films of good elasticity after unusually short drying periods. Moreover, the films were found to possess outstanding adhesiveness and deep-drawing properties when applied to metals.

Example 2

515 parts by weight of Preproduct A dissolved in xylene to the extent of 70%
245 parts by weight xylene and
200 parts by weight butanol
  are mixed together, and heated up to 120 to 130° C. The following mixture is then added as in Example 1 and polymerized:
6 parts by weight benzoyl peroxide
12 parts by weight methacrylic acid
48 parts by weight hydroxypropylmethacrylate
60 parts by weight butylacrylate
120 parts by weight styrene The viscosity of the 50% solution is about 30 to 50 DIN-sec., measured at 20° C.

Example 3

428 parts by weight of Preproduct A dissolved in xylene to the extent of 70%
272 parts by weight xylene and
200 parts by weight butanol
  are mixed together and heated up to 120 to 130° C. The following mixture is then added as in Example 1 and polymerized:
6 parts by weight benzoyl peroxide
12 parts by weight methacrylic acid
78 parts by weight butylacrylate
90 parts by weight hydroxypropylmethacrylate
120 parts by weight styrene The viscosity of the 50% solution is about 60 to 90 DIN-sec., measured at 20° C.

Example 4

343 parts by weight Preproduct A dissolved in xylene to the extent of 70%
297 parts by weight xylene and
200 parts by weight butanol
  are mixed together and heated up to 120 to 130° C. The following mixture is then added as in Example 1 and polymerized:
6 parts by weight benzoyl peroxide

Example 4—Continued 12 parts by weight methacrylic acid
90 parts by weight hydroxypropylmethacrylate
120 parts by weight butylacrylate
138 parts by weight methylmethacrylate The viscosity of the 50% solution is about 120 to 160 DIN-sec., measured at 20° C.

Example 5

285 parts by weight Preproduct A dissolved in xylene to the extent of 70%
322 parts by weight xylene and
200 parts by weight butanol
are mixed together and heated to 120 to 130° C. The following mixture is then added as in Example 1 and polymerized:
6 parts by weight benzoyl peroxide
24 parts by weight methacrylic acid
90 parts by weight hydroxypropylmethacrylate
150 parts by weight styrene
156 parts by weight butylacrylate The viscosity of the 50% solution is about 140 to 200 DIN-sec., measured at 20° C.

Example 6

516 parts by weight Preproduct B is dissolved in xylene to the extent of 81.5%
117 parts by weight xylene and
134 parts by weight butanol
are mixed together and heated up to 120 to 130° C. The following mixture is then added as in Example 1 and polymerized:
6 parts by weight benzoyl peroxide
12 parts by weight methacrylic acid
48 parts by weight hydroxypropylmethacrylate
120 parts by weight butylacrylate The viscosity of the 60% solution is about 150 to 200 DIN-sec., measured at 20° C.

Example 7

442 parts by weight Preproduct B dissolved in xylene to the extent of 81.5%
318 parts by weight xylene and
200 parts by weight butanol are mixed together and heated up to 120 to 130° C. The following mixture is then added as in Example 1 and polymerized:

The following mixture is then added as in Example 1 and
6 parts by weight benzoyl peroxide
12 parts by weight methacrylic acid
48 parts by weight hydroxypropylmethacrylate
60 parts by weight butylacrylate
120 parts by weight styrene The viscosity of the 50% solution is about 200 DIN-sec., measured at 20° C.

Example 8

368 parts by weight Preproduct B dissolved in xylene to the extent of 81.5%
332 parts by weight xylene and
200 parts by weight butanol
are mixed together and heated up to 120 to 130° C. The following mixture is then added as in Example 1 and polymerized:
8 parts by weight benzoyl peroxide
12 parts by weight methacrylic acid
120 parts by weight styrene
90 parts by weight hydroxypropylmethacrylate
78 parts by weight butylacrylate The viscosity of the 50% solution is about 400 DIN-sec., measured at 20° C.

Example 9

420 parts by weight Preproduct C of 100% conc.
266 parts by weight xylene and
134 parts by weight butanol
are mixed together and heated up to 120 to 130° C. The following mixture is then added as in Example 1 and polymerized:
48 parts by weight hydroxypropylmethacrylate
12 parts by weight methacrylic acid
120 parts by weight butylacrylate
6 parts by weight benzoyl peroxide The viscosity of the 60% solution is about 140 DIN-sec., measured at 20° C.

Example 10

240 parts by weight Preproduct C of 100% conc.
400 parts by weight xylene and
200 parts by weight butanol
are mixed together and heated up to 120 to 130° C. The following mixture is then added as in Example 1 and polymerized:
6 parts by weight benzoyl peroxide
90 parts by weight hydroxypropylmethacrylate
12 parts by weight methacrylic acid
120 parts by weight butylacrylate
138 parts by weight methylmethacrylate The viscosity of the 50% solution is about 150 DIN-sec., measured at 20° C.

Example 11

322 parts by weight Preproduct A dissolved in xylene to the extent of 70%
18 parts by weight acrylamide
27 parts by weight styrene
30 parts by weight hydroxypropylmethacrylate
53 parts by weight xylene
100 parts by weight butanol and
6 parts by weight laurylmercaptan
are mixed together and heated up to 120 to 130° C. To this mixture are added, in one hour, 3 parts by weight p-tert.-butyl peroxide dissolved in
50 parts by weight xylene
and the whole is polymerized at 130° C. to a solids content of 50%.

Example 12

515 parts by weight Preproduct A dissolved in xylene
145 parts by weight xylene
200 parts by weight butanol
50 parts by weight acrylamide
70 parts by weight styrene
60 parts by weight butylacrylate
12 parts by weight methacrylic acid
48 parts by weight hydroxypropylmethacrylate and
16 parts by weight laurylmercaptan
are mixed together and heated up to 120 to 130° C. To this mixture are added, in one hour, 8 parts by weight p-tert.-butylperoxide dissolved in
100 parts by weight xylene
and the whole is polymerized at 130° C. to a solids content of 50%.

Example 13

428 parts by weight Preproduct D dissolved in xylene to the extent of 70%
272 parts by weight xylene and
200 parts by weight butanol
are mixed together and heated up to 120 to 130° C. The following mixture is then added as in Example 1 and polymerized until the solution has a solids content of 50%:

*Example 13—Continued*

6 parts by weight benzoyl peroxide
12 parts by weight methacrylic acid
78 parts by weight butylacrylate
90 parts by weight hydroxypropylmethacrylate
120 parts by weight styrene

I claim:
1. A process for the preparation of copolymers of polyesters containing polymerizable groups and $\alpha,\beta$-ethylenically unsaturated compounds, which is characterized in that

(a) 10 to 90% by weight of polyesters obtained by esterification or re-esterification of (1) at least one member of a group consisting of saturated and unsaturated natural oils and fats and their fatty acids and synthetic fatty acids, having 5 to 22 carbon atoms, with (2) at least one polyalcohol having 2 to 6 carbon atoms and (3) at least one member of a group consisting of saturated and unsaturated dicarboxylic acids, these having been selected and reacted in such a manner that a polyester, having an acid number from 3 to 40 and of average molecular weight of about 600 to 2500, is obtained, wherein component (1) is present in an amount of 30 to 70% by weight and the dicarboxylic acid (component 3) is present in amounts of 30 to 70% by weight, and (b) 10–90% by weight of mixtures consisting of $b'$ and $b''$, $b'$ being $\alpha,\beta$-ethylenically unsaturated compounds that contain no reactive hydrogen atoms, singly or in the form of mixtures, and $b''$ being $\alpha,\beta$-ethylenically unsaturated compounds that contain at least one reactive hydrogen atom, singly or in the form of mixtures, wherein $b'$, either singly or in the form of mixtures, consists of 50 to 90% by weight of $\alpha,\beta$-ethylenically unsaturated compounds that contain no reactive hydrogen atoms, and $b''$ comprises 10 to 50% by weight of an $\alpha,\beta$-ethylenically unsaturated compound having at least one reactive hydrogen atom and includes at least one compound containing an alcoholic hydroxyl group, said compound comprising an ester selected from a group consisting of 2-hydroxyethylacrylate, 2-hydroxypropylacrylate, 3-hydroxybutylacrylate, 6-hydroxyhexylacrylate and the corresponding methacrylates and ethacrylates and phenylacrylates, 2-hydroxypropylbutylmaleinate and di-(2-hydroxypropyl)-maleinate and fumarate, 2-hydroxy-3-chloropropylacrylate, 2-hydroxy-1-phenylethacrylate, 2,3-dihydroxypropylacrylate and the corresponding methacrylates and ethacrylates and phenylacrylates and mixtures thereof, are copolymerized by heating in the presence of a solvent and polymerization promoter, said solvent being substantially inert and participating in the reaction to only an insignificant extent and said promoter being such as to break up into radicals at the selected reaction temperature to thus initiate the polymerization, the percentages by weight of components (a) and (b) being calculated on the basis of the sum of (a) and (b).

2. The product resulting from the process of claim 1.

References Cited by the Examiner

UNITED STATES PATENTS

| | | | |
|---|---|---|---|
| 2,647,093 | 7/1953 | Opp et al. | 260—22 |
| 2,939,854 | 6/1960 | Christenson | 260—22 |
| 3,052,659 | 9/1962 | Woodruff | 260—22 |
| 3,163,615 | 12/1964 | Sekmakas | 260—22 |

FOREIGN PATENTS 1,180,231  6/1959  France.

LEON J. BERCOVITZ, *Primary Examiner.*

R. W. GRIFFIN, *Assistant Examiner.*